US010464173B2

(12) United States Patent
Chen (10) Patent No.: US 10,464,173 B2
(45) Date of Patent: Nov. 5, 2019

(54) WELDING APPARATUS AND METHOD (71) Applicant: Jiayuan Chen, Windsor (CA)

(72) Inventor: Jiayuan Chen, Windsor (CA)

( * ) Notice: Subject to any disclaimer, the term of this patent is extended or adjusted under 35 U.S.C. 154(b) by 758 days.

(21) Appl. No.: 15/171,667

(22) Filed: Jun. 2, 2016

(65) Prior Publication Data

US 2017/0348788 A1    Dec. 7, 2017

(51) Int. Cl.
*B23K 35/02* (2006.01)
*B23K 11/00* (2006.01)
*B23K 11/14* (2006.01)
*B23K 11/16* (2006.01)
*B23K 11/34* (2006.01)
*B23K 11/36* (2006.01)
*B23K 101/00* (2006.01)
*B23K 101/18* (2006.01)
*B23K 103/04* (2006.01)

(52) U.S. Cl.
CPC ...... *B23K 35/0255* (2013.01); *B23K 11/0046* (2013.01); *B23K 11/14* (2013.01); *B23K 11/16* (2013.01); *B23K 11/34* (2013.01); *B23K 11/36* (2013.01); *B23K 2101/006* (2018.08); *B23K 2101/18* (2018.08); *B23K 2103/04* (2018.08)

(58) Field of Classification Search
CPC ............ B23K 35/0255; B23K 11/0046; B23K 11/14; B23K 11/16; B23K 11/34; B23K 11/36; B23K 2101/006; B23K 2101/18; B23K 2103/04; B23K 11/30; B23K 11/3054; B23K 11/3018; B23K 11/3545; B23K 11/0006; B23K 11/002
See application file for complete search history.

(56) References Cited

U.S. PATENT DOCUMENTS

| | | | |
|---|---|---|---|
| 2,470,552 | A | 5/1949 | Gottschalk |
| 3,134,883 | A | 5/1964 | Bennett et al. |
| 3,238,352 | A | 3/1966 | Kollmann et al. |
| 3,657,509 | A | 4/1972 | Beneteau |
| 4,020,316 | A | 4/1977 | Schaft et al. |
| 4,609,805 | A | 9/1986 | Tobita et al. |
| 4,947,019 | A | 8/1990 | Akiyama et al. |

(Continued)

FOREIGN PATENT DOCUMENTS

| | | |
|---|---|---|
| DE | 10209492 | 10/2003 |
| WO | 2008144873 | 12/2008 |

*Primary Examiner* — David J Walczak
(74) *Attorney, Agent, or Firm* — Black, McCuskey, Souers & Arbaugh, LPA (57) ABSTRACT

A welding electrode apparatus has an electrode base, and electrode tip, and a locking ring that clamps the tip to the base, and that, when released, permits the tip to be replaced when worn. The locking ring and electrode tip co-operate to define an accommodation for a machine fed nut. The locking ring has a non-electrically conductive end face, and stands proud of the tip of the electrode. The locking ring has an unobstructed outside peripheral face suitable for gripping and tightening or loosening with a wrench. The locking ring has an internal, annular fluid cooling gallery and inlet and outlet ports tapped into the gallery. The cross-section of the gallery is non circular. The wall thickness of the part is roughly constant. On assembly and installation, the locking ring clamps to the tip and base, and provides a thermal conduction heat path to each of them.

20 Claims, 6 Drawing Sheets

(56) References Cited

U.S. PATENT DOCUMENTS

| | | | |
|---|---|---|---|
| 5,471,029 | A | 11/1995 | Simmons |
| 6,624,379 | B1 | 9/2003 | Thornton et al. |
| 6,750,419 | B2 | 6/2004 | Roddy et al. |
| 6,875,946 | B2 | 4/2005 | Hidaka |
| 8,513,561 | B2 | 8/2013 | Kuechenmeister et al. |
| 9,211,604 | B2 * | 12/2015 | Ikoma .................. B23K 11/002 |
| 9,440,308 | B2 * | 9/2016 | Roddy ............... B23K 11/3018 |
| 2008/0190899 | A1 | 8/2008 | Sugahara et al. |
| 2013/0092435 | A1 | 4/2013 | Spencer et al. |

\* cited by examiner

WELDING APPARATUS AND METHOD

BACKGROUND

In automated processes, such as in the automotive industry, nuts may be welded to body components, such as formed mild steel sheet members, prior to assembly. The nuts are typically welded to the sheet at specified locations. The head of the welding electrode has a limited life, for many reasons. Typically, the electrode tip is made of copper or a copper alloy, and is consumed over time, as the repeated heating and cooling of the tip degrades the tip. Where the nuts are fed to the welding electrode heads automatically, it is not desirable to weld the nuts in the wrong location or upside down.

SUMMARY

Disclosed herein in at least one embodiment is a welding electrode apparatus. It has a first member, a second member, and a third member. The first member defines an electrode base for connection to a power source. The third member defines an electrically conductive tip for mounting in electrically conductive engagement to the electrode base. The second member defines a clamp operable to secure the third member to the first member. The second member having an arcuately extending fluid-flow cooling gallery defined therewithin.

In a feature of at least one embodiment, the second member is non-electrically conductive. In another feature, the second member defines an annulus, and the cooling gallery defines a circumferentially arcuate passageway about the annulus. In a further feature, the cooling gallery is of non-circular cross-section transverse to coolant flow direction. In still another feature, the cooling gallery has a radially inner wall that is at least partially conically tapering. In a yet further feature, the second member is leewardly ported on the second member.

In another feature, the second member has a first end face that, on assembly, is oriented axially away from the first member. The first end face is non-electrically conductive. In an additional feature, the second member has a second end face that faces away from the first end face, and the second end face has coolant fluid ports therein. In still another feature, the cooling gallery extends arcuately entirely around the second member. In a further additional feature, the coolant fluid ports are located opposite each other, on opposite sides of the central base as assembled. In still another feature, the cooling gallery has an extent that is at least one of (a) at least half the axial extent of the second member; and (b) at least half the annular radial extent of the second member. In yet another feature, the second member has an external peripheral wall that is free of obstructions, whereby the external peripheral wall can be gripped for tightening of the clamp.

In at least one embodiment, there is a welding apparatus operable to attach a weldable fastener to a workpiece, the fastener having a first face for electrically conductive engagement with the welding apparatus, and an opposite second face that is oriented toward the workpiece. The welding apparatus has a first member and a second member. The first member includes an electrically conductive electrode tip for electrical contact with the fastener. The second member is fixedly located relative to the first member. The second member having an electrically insulated portion that stands proud of the first member.

In a feature of at least one embodiment, the second member clamps to the first member. In another feature, the first face of the fastener has a first footprint, and the second face of the fastener has a second footprint. The first and second footprints are different. At least a portion of the second footprint projects outside the first footprint. The second member has a land accommodating the first footprint but not the second footprint. In another feature, the second member has an accommodation defined therein. The accommodation has a shape conforming to, and admitting, the first face of the fastener.

In a further feature, the second member has a cooling gallery defined therewithin, and porting by which to supply coolant to the gallery. In another feature, the second member defines an annulus, and the cooling gallery defines a circumferentially arcuate passageway about the annulus. In still another feature, the cooling gallery is of non-circular cross-section transverse to coolant flow direction. In another feature, the cooling gallery has a radially inner wall that is at least partially conically tapering. In an additional feature, the second member has a first end wall for orientation toward the workpiece, and a second end wall that faces away from the first end wall, and the second end wall has coolant fluid ports therein. In another additional feature, the cooling gallery has an extent that is at least one of (a) at least half the axial extent of the second member; and (b) at least half the annular radial extent of the second member. In another feature, the second member has an external peripheral wall that is free of obstructions, so the external peripheral wall can be gripped for tightening of the clamp.

In one embodiment, there is any apparatus substantially as shown or described herein, in whole or in part.

BRIEF DESCRIPTION OF THE DRAWINGS

FIG. 2b shows a diametric cross-section of the welding apparatus of FIG. 2a;

FIG. 3d shows a perspective view similar to that of FIG. 3b with a nut with a base in place in the apparatus of FIG. 3a.

DETAILED DESCRIPTION

The description that follows, and the embodiments described therein, are provided by way of illustration of an example, or examples, of particular embodiments incorporating one or more of the principles, aspects, and features of certain embodiments. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

For the purposes of this description, a cylindrical polar frame of reference may be used. That is, the description may pertain to welding heads, welding rods, and so on that are formed as bodies of revolution about a central axis. In such a frame of reference, the axis, being the long axis of the apparatus, may be the vertical or z-axis. In such a frame of reference, the long, or largest, dimension of an object may be considered to extend in the direction of the z-axis, the base of the article, where substantially planar, may be considered to extend in an r-theta plane, and the height of the article may be measured in the vertical, or z-direction. Unless noted otherwise, the terms "inside" and "outside", "inwardly" and "outwardly", refer to location or orientation relative to the central axis. In this description, when an item, or structure, is indicated as being insulated, such term is understood to mean that the wall has a layer of insulation. In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than".

The terminology used in this specification is thought to be consistent with the customary and ordinary meanings of those terms as they would be understood by a person of ordinary skill in the art in North America. The Applicants expressly exclude all interpretations that are inconsistent with this specification, and, in particular, expressly exclude any interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

In this description the terms "non-electrically conductive" or "electrically insulated" may be used. The electrical conductivity of materials may vary by many orders of magnitude, from highly conductive materials, such as pure copper, gold, or aluminum to extremely poor conductors, such as bakelite, ceramics, rubbers and so on. In context, "non-electrically conductive" and "electrically insulated" may be understood by comparison to the electrical conductivity of the copper electrode base and the copper or copper-alloy electrode tip, which are intended to conduct high electrical current for welding, and less conductive materials or coatings that are intended not to allow sufficient current flow for welding to occur.

In the examples herein, the non-electrically conductive elements may include oxide coatings or finishes, or may include ceramic or quasi-ceramic coatings. These finishes or coatings, however they may be termed, may include coatings such as an Aluminum Oxide Al2O3 coating such as may tend to anodize the surface and make it non-conductive. Such coatings may tend to be resistant to conduction at relatively high temperatures.

Figure 1:
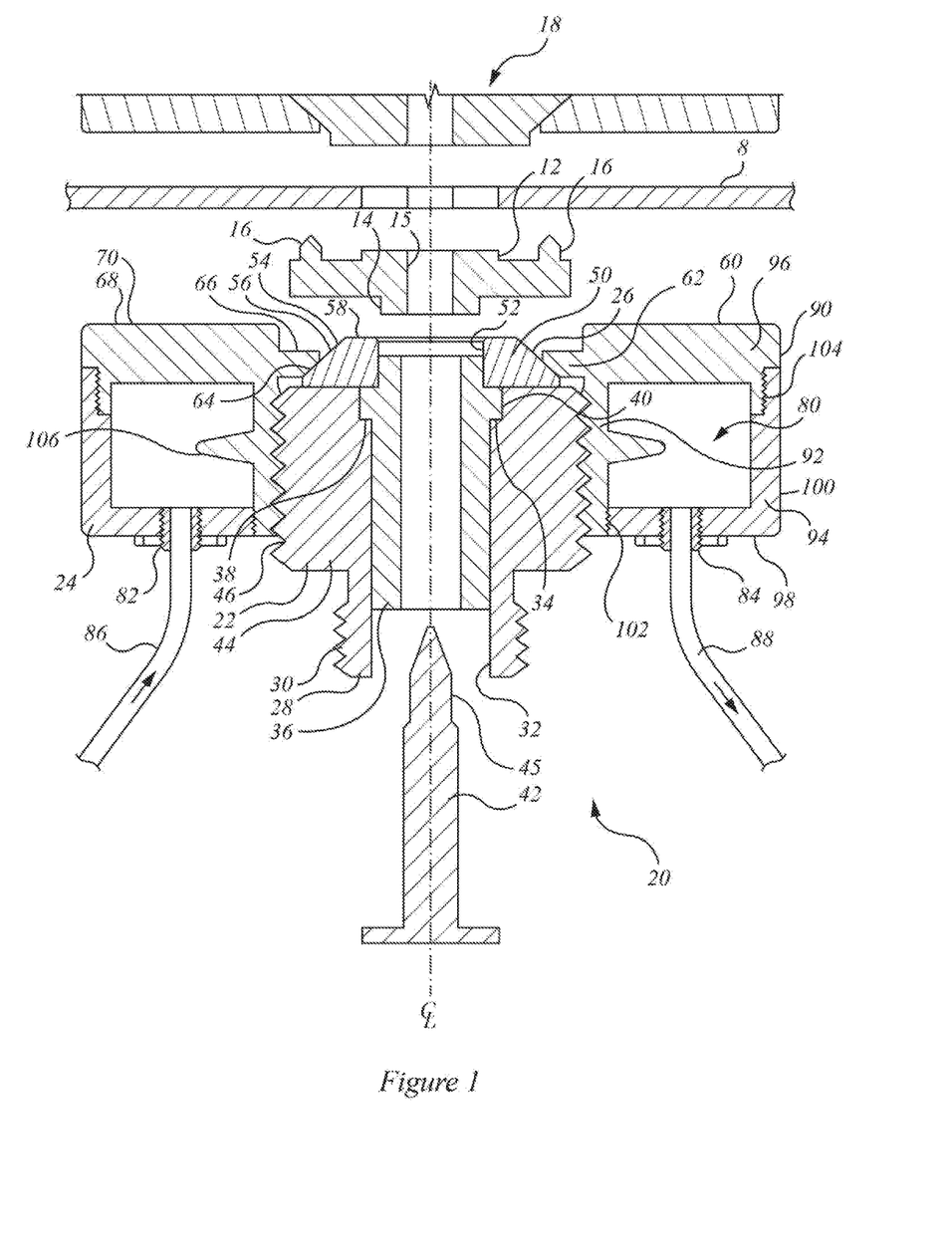
FIG. 1 shows a cross-section of a first embodiment of a welding apparatus and a fastener to be welded.

By way of a general overview, a welding apparatus is shown in FIG. 1 in central vertical cross-section generally as 20. It may be used for welding on an automotive assembly line. Apparatus 20 may typically be opposed by a co-operating welding head, or welding apparatus, shown, for example, in scab section as item 18. A machine-fed nut is indicated as 110. It is not part of welding apparatus 20. Nut 110 is a first work-piece to be secured to a second, or base, work-piece, such as a mild steel sheet or formed body panel 8. In operation, the two opposed heads 20, 18 are brought together, thereby closing nut 110 on panel 8 and forming an electrically conductive path. When the materials are held together in contact, often under axial pressure, an electrical current is applied, causing the parts to weld together. It is arbitrary which apparatus is considered male or female, or whether one, the other, or both are movable.

Nut 110 may have an upward boss 12, such as may fit in a pre-stamped opening in sheet-metal 8. It may also have a downward facing boss 14, such as may locate in a socket of welding apparatus 20. Boss 14 need not be circular. It may have a non-circular shape that is to be installed with a particular orientation relative to the sheet metal, such as may be required where the nut is to be placed close to an out of plane web feature of the sheet metal. Boss 14 may, for example, have a square or hexagonal head shape. The internally threaded bore of nut 110 is indicated as 15. Nut 110 has prongs, or nubs, or pads 16 that protrude upwardly from the upper surface. As nut 110 is typically a steel alloy, and is therefore electrically conductive, pads 16 may tend to be the first points of contact of nut 110 with the sheet-metal 8 to which nut 110 is to be welded. As such, welding current from the electrode apparatus will flow first through pads 16, causing them to melt and to weld to the sheet-metal 8.

Figure 3A:
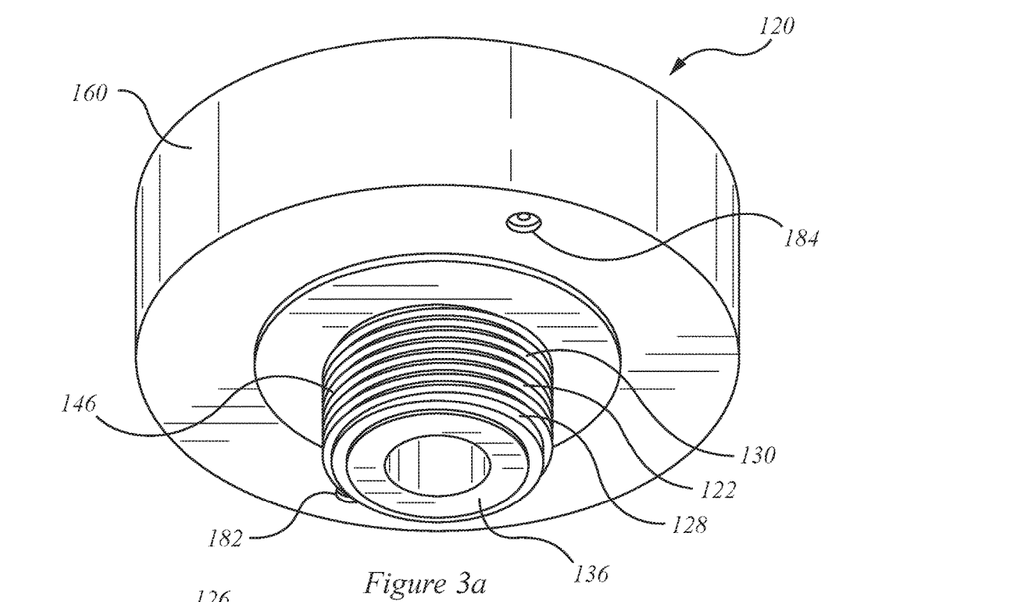
FIG. 3a shows a perspective view from below of the welding apparatus of FIG. 2a as assembled.
Figure 3B:
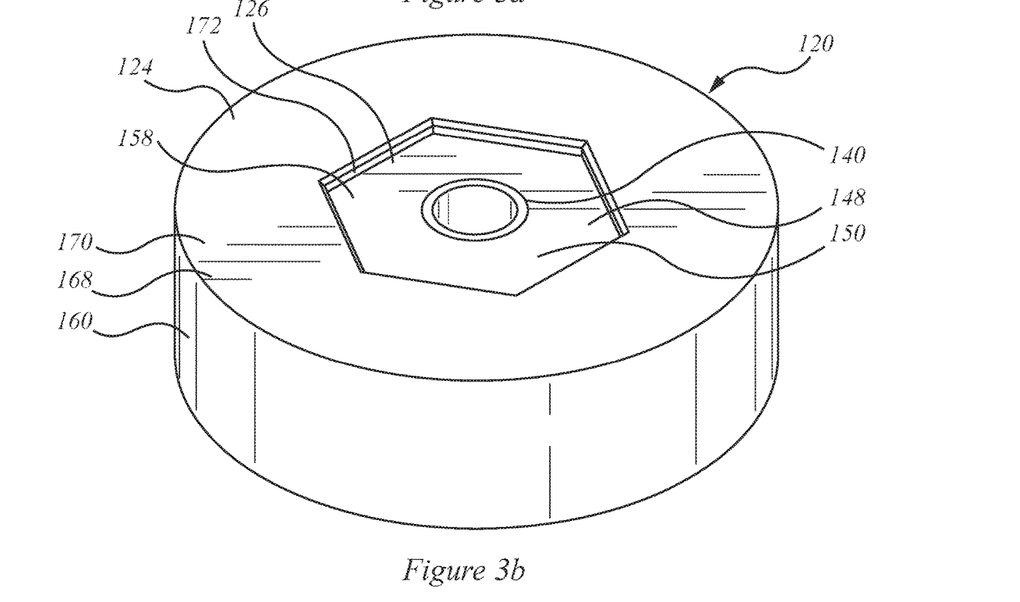
FIG. 3b shows a perspective view from above of the welding apparatus of FIG. 3a as assembled.
Figure 3C:
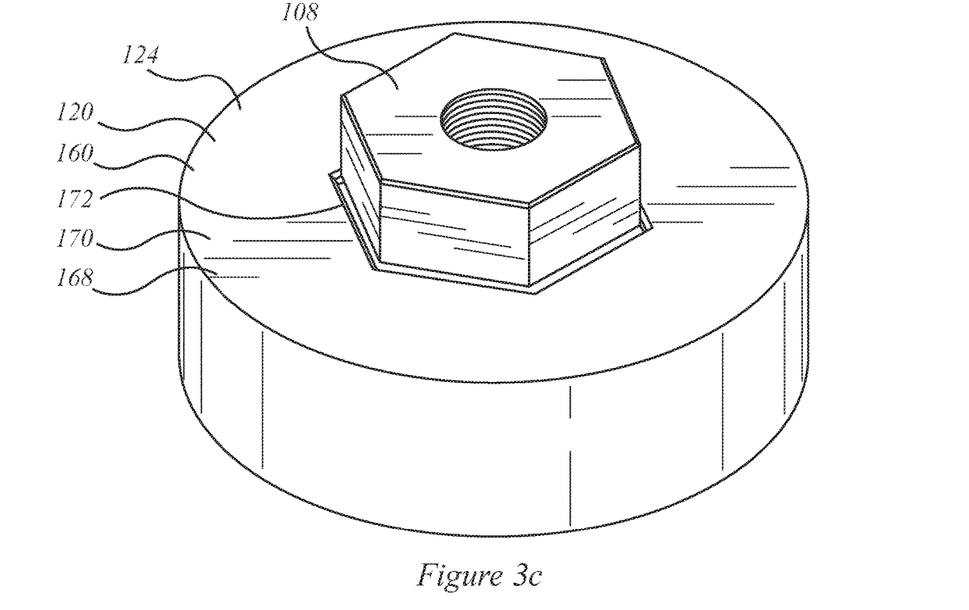
FIG. 3c shows a perspective view similar to that of FIG. 3b with a hexagonal nut in place.
Figure 3D:
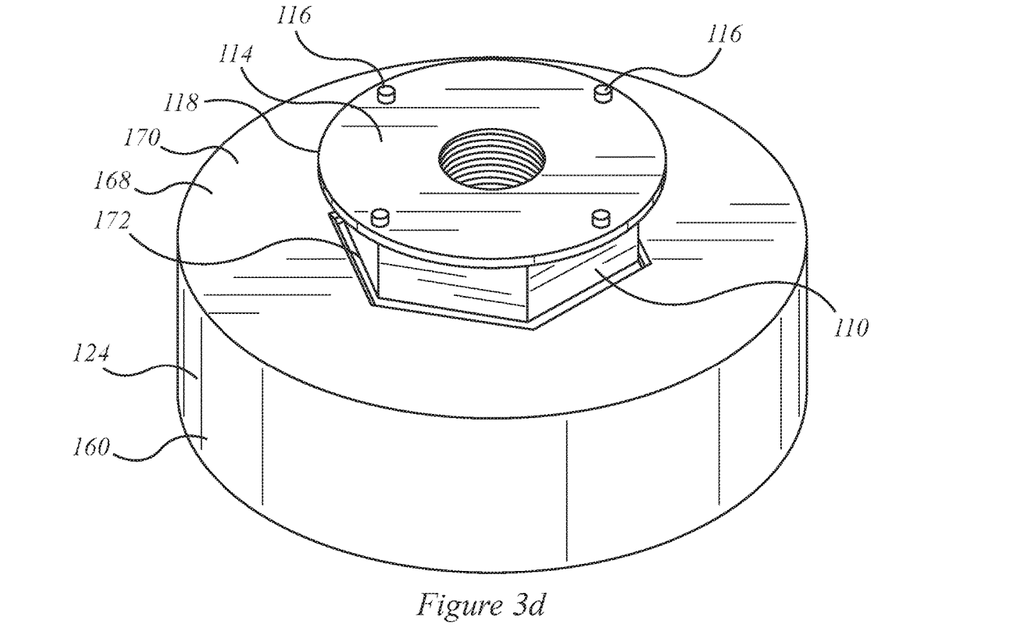

Boss 14 and boss 12 need not be of the same shape or size. For example, boss 12 may be circular, and may approximate the shape of a round nut base, as if a washer had been pre-formed on the underside of the head of a hex-head nut. In such a case the base of the nut has a diameter that is larger than the hex-head (see, for example, base 114 of nut 110 of FIG. 3*d*). The hex head defines a first footprint, namely the axial projection of the hexagonal head shape; and the base can be said to define a second footprint, namely the axial projection of the circular base. Where the hex-head (or square head, or other shaped head, as may be) may be of a standard size to fit a mating socket of a tightening tool, the footprint of the hex-head mates with the tool. The footprint of the round base is too large to enter the tool. Thus if the nut is place upside-down on the tool, it cannot fit into the socket. The second footprint need not be round, and not all of the second footprint need fall outside the periphery defined by the first footprint. The nut will be prevented from entering the socket upside-down where any portion, or portions, of the second footprint protrude beyond the periphery of the first footprint.

Welding apparatus 20 has a first member 22, a second member 24, and a third member 26. First member 22 may be a main body member, identified as an electrode base. It is typically made of copper. It has a first, or lower, end 28 that is externally threaded as at 30, by which it is screwed into an electrode holder, thereby being connected to a power source of the welding apparatus. The inside of electrode base 22 defines, or has, a smooth bore 32 that has a larger radius shoulder 34 at the upper end. An insulation sleeve 36 sits within bore 32, the sleeve having a mating outwardly extending shoulder 38 that seats in shoulder 34 of bore 32. Insulation sleeve 36 also has an upwardly extending annular stub 40. Insulation sleeve 36 may be a ceramic member, or an anodized plug. A reciprocating centering pin 42 moves axially within sleeve 36. Pin 42 may be made of stainless steel. Pin 42 has a pointed tip 45, which, when driven upward, tends to center nut 110 on a pre-made fastener hole in the sheet-metal 8. Centering pin 42 is typically non-conductive, and may be an anodized part. First member 22 has an upper portion 44 that is externally threaded as at 46.

Third member 26 may be a welding electrode tip such as may have the form of an electrically conductive copper annulus, or washer, or disc 50 that has a central bore 52 that seats about axially protruding stub 40 of sleeve 36. Bore 52 has a length that is longer than the sum of the length L40 of stub 40 and the protrusion dimension L14 of boss 14. The inlet of bore 52 is typically chamfered or radiused to facilitate seating of boss 14 therein. Copper disc 50 also has an external land, or engagement surface 54, in the form of an axially truncated conical ring 56, and an electrically conductive end face 58 that defines the engagement interface with nut 10.

Second member 24 may be an annular clamping member 60 that is internally threaded to mate with the upper externally threaded portion 44 of first member 22. Clamping member 60 has a radially inwardly extending arm, or surround, or circumferential bezel, 62. Bezel 62 may have a lower radially innermost margin having a conical surface 64. Surface 64 mates with conical surface of external land 54. When clamping member 60 is tightened on threads 46, the resulting axial motion causes surface 64 to engage land 54 and clamp disc 50 against the axially upward end face of main body or base 22. A path for electric current is then established through the large, annular, planar contact surfaces of base member 22 and disc 50. The tightening of clamping member 60 will also set the angular orientation of disc 50, and hence the angular orientation of any nut 110 that seats in the socket defined by bore 52 of disc 50.

In this description, the second member, or clamp, or clamping member 60, may be indicated as having a land, such as surface 64. The term "land" in this context may refer to a member, such as a continuous peripheral bezel, having an aperture formed therethrough, the aperture having a continuous periphery, or a set of tabs or tangs, or fingers, or protrusions, or islands, i.e., a plurality of discrete members that co-operate, as may intercept the passage of larger or misshapen objects. In context, the "land" is the surface, or array, presented to intercept incorrectly sized, incorrectly shaped, or incorrectly oriented objects, as may be.

Bezel 62 of clamping member 60 also has an upper shoulder 66, which is axially recessed from clamping member end face 68 by a distance L66. The axially upwardly facing surface of shoulder 66 is electrically non-conductive, and may have an aluminum oxide surface coating. Clamping member 60 has an end face oriented toward sheet 8 that has an external surface 70 that is not electrically conductive, but rather that is an electrical insulator. For example, the external surface 70 of clamping member 60 may have an aluminum oxide coating, such that it is anodized. External surface 70 of second member 24 stands axially proud of engagement interface 58 of disc 50 by a distance L70.

In the event that there is no nut 110 in the socket defined by bore 52 of disc 50, end face 70 will meet the sheet metal workpiece 8 before end face 58 of disc 50, and no current will flow, tending to prevent damage to the electrode and to the workpiece. That is, the fact that surface 70 stands axially proud of end face 58 is an error detection or error prevention feature that prevents the machine from operating in the event that no nut is in place. Note also that the socket defined by bore 52 may not necessarily be circular. It may be taken as being square or hexagonal, for example. That is, where the angular orientation of nut 110 relative to sheet 8 is fixed, bore 52 may have a corresponding flat or flats, or spline, or other shape, to permit seating of nut 110 only according to a pre-determined design orientation.

In the event that nut 110 falls upside-down onto disc 50, the tips of pads or nubs 16 will encounter the non-electrically conductive face of upper shoulder 66, of surround 62, and nut 110 will be held away from disc 50, so that the gap prevents an electrical path from being established. That is, the length of nubs 16 exceeds the height of upper boss 12 by a distance greater than the distance by which surface 54 stands axially proud of shoulder 66. If the electrode apparatus 20 attempts to close on sheet metal 8 no electrical current will flow, preventing a weld from being made in error. This is a second nut orientation error prevention feature of apparatus 20.

A welding electrode assembly 20, such as shown, may have electrical discharge currents of up to 45 kA. While disc 50 is intended to be consumable over time—typically 15,000 cycles—the life of such units can be extended by preventing undue heating. To that end, the locking ring, namely clamping member 60, may have an internal cooling chamber or cooling gallery 80, having an inlet fitting or tap at 82 and a diametrically opposed outlet fitting or tap at 84, with corresponding coolant supply and return lines 86, 88. While two such taps are shown, there could be more, such as four taps spaced equally about the circumference. Not all taps need pipe fittings, and, where more than two taps are provided, two such taps might be used, while the others may be fitted with plugs to prevent flow. In any case, each embodiment requires an inlet and an outlet. In operation, 3-4 US gal/minute (12-16 L/min) of cold water flows through this gallery. Clamping member 60 may be made of beryllium copper. The tight interface between clamping member 60 and threads 46 provides a conduction heat transfer path to base member 22. The tight clamping interface across the mating conical surfaces 156 and 162 provides a direct thermal conduction path between disc 50 and clamping member 60. There is also a secondary conduction path from disc 50 through base member 22 to member 60.

In one embodiment, clamping member 60 may be a 3-D printed part. In another, it may be made by a lost wax or investment casting process. In another embodiment, clamping member 60 may be made of a bobbin 90 and a co-operating cylindrical threaded sleeve 100, the two parts being threaded to screw together. Cooling gallery 80 is bounded by a radially inner wall, 92, a radially outer wall 94, a first, front, or top end wall 96 that defines end face 68; and a second, rear, or lower end wall 98 that is distant from the workpiece.

Bobbin 90 may be a monolithic part that includes walls 92, 96 and 98. Wall 92 may be of the order of 2 to 3 mm thick at the lower threads. Walls 96 and 98 may be of the order of 2½ to 3 mm thick. Sleeve 100 includes most of outer circumferential wall 94, which is threaded at 102 and 104. On assembly, a bonding agent, which may be an eutectic bonding agent, may be applied to threads 102 and 104. The part may bond to form a sealed wall, and thereafter not be taken apart. The entire part may then be anodized with an aluminum oxide coating. The outside face of wall 94 may by knurled to improve grip on tightening. Rearward facing wall 98 may have the inlet and outlet ports or taps 82, 84. Placing the coolant taps in the rear wall, i.e., in the protected shadow, or lee, of clamping member 60 more generally, may tend to protect those fittings, as opposed to having them on the outside, knurled tightening surface where they may be more prone to abuse or damage. The radially outermost, external circumferential surface, whether knurled or provided with flats for engagement by a wrench, is also then free of penetrations or puncture, and also free of obstruction by fittings, such that the part may be more easily loosened or tightened to facilitate replacement of disc 50.

The resultant coolant flow gallery may then tend to be of substantially constant cross-section around the entire circumference of gallery 80. That cross-section may also be comparatively large, having a width in the radial direction that is greater than the through thickness of either wall 92, wall 94, or of both taken together. Unlike a series of externally drilled tangential bores that intersect internally within a solid monolith, and which are then selectively externally plugged to define a unique internal flow path, the coolant flow passageway of gallery 80, defined in clamping member 60, is arcuate in the circumferential direction. That is, the flow passage follows the arcuate path of the annular space extending about clamping member 60. It is also of non-circular cross-section transverse to the direction of flow. For example, in the embodiment of FIG. 1, that cross-section is substantially rectangular.

Furthermore, inner wall 92 is of substantially constant thickness from top to bottom, and can be relatively thin, such that the thermal conduction heat-transfer path through that wall thickness to first member 22 is relatively short. Similarly, flow gallery 80 occupies substantially the full radial extent of the annulus defined between the wings or flanges of bobbin 90 defined by walls 96 and 98. That is, the exposed area for heat transfer from those walls is more than half their surface area. In an alternative embodiment, the outside face of wall 92 may be ribbed or finned, as at 106. Such a rib or fin may be continuous, or may be intermittent, as in the nature of a series of circumferentially arrayed teeth. The wall thickness of wall 92 between the fluid flow passage and first member 22 is substantially constant about the periphery of locking ring 60. The use of a flow path of roughly constant geometry may tend to discourage, or decrease, the tendency for some spots to be cooled more effectively than others, leading to a more even, or more evenly distributed, cooling effect.

In this embodiment, as described, the locking ring defines a liquid cooling manifold or gallery or passageway. The locking ring defines a first, direct, conduction heat transfer path between the ring and disc 50; and also a second cooling path between the locking ring and electrode base member 22. This is so whether or not the base member, namely first member 22, is provided with any other internal cooling. Providing cooling to the locking ring may tend to permit first member 22 not to have complicated internal cooling galleries itself, and may permit the retrofit of an actively cooled locking ring to previous assemblies that may not have had active fluid cooling. First member 22 may tend to be removed and replaced more easily than the base equipment to which first member 22 is mounted. In such a retrofit installation, the geometry of threads 30 may be retained, while first member 22 and second member 24 are different. In either case, base member 22 may fit in the same geometric space envelope as the previous electrode base member, avoiding a design change of the tool holder.

In the embodiment, being anodized, the locking ring is non-electrically conductive. It may have three forms of error prevention or correction. First, the locking ring has a non-electrically-conductive shoulder positioned to stand the nut away from the disc when the nut is upside-down. Second, the locking ring stands axially proud of the disc to prevent welding from occurring where no nut is present. Third, the locking ring and disc combination are adjustable to set angular orientation of the nut relative to the sheet-metal.

Figure 2A:
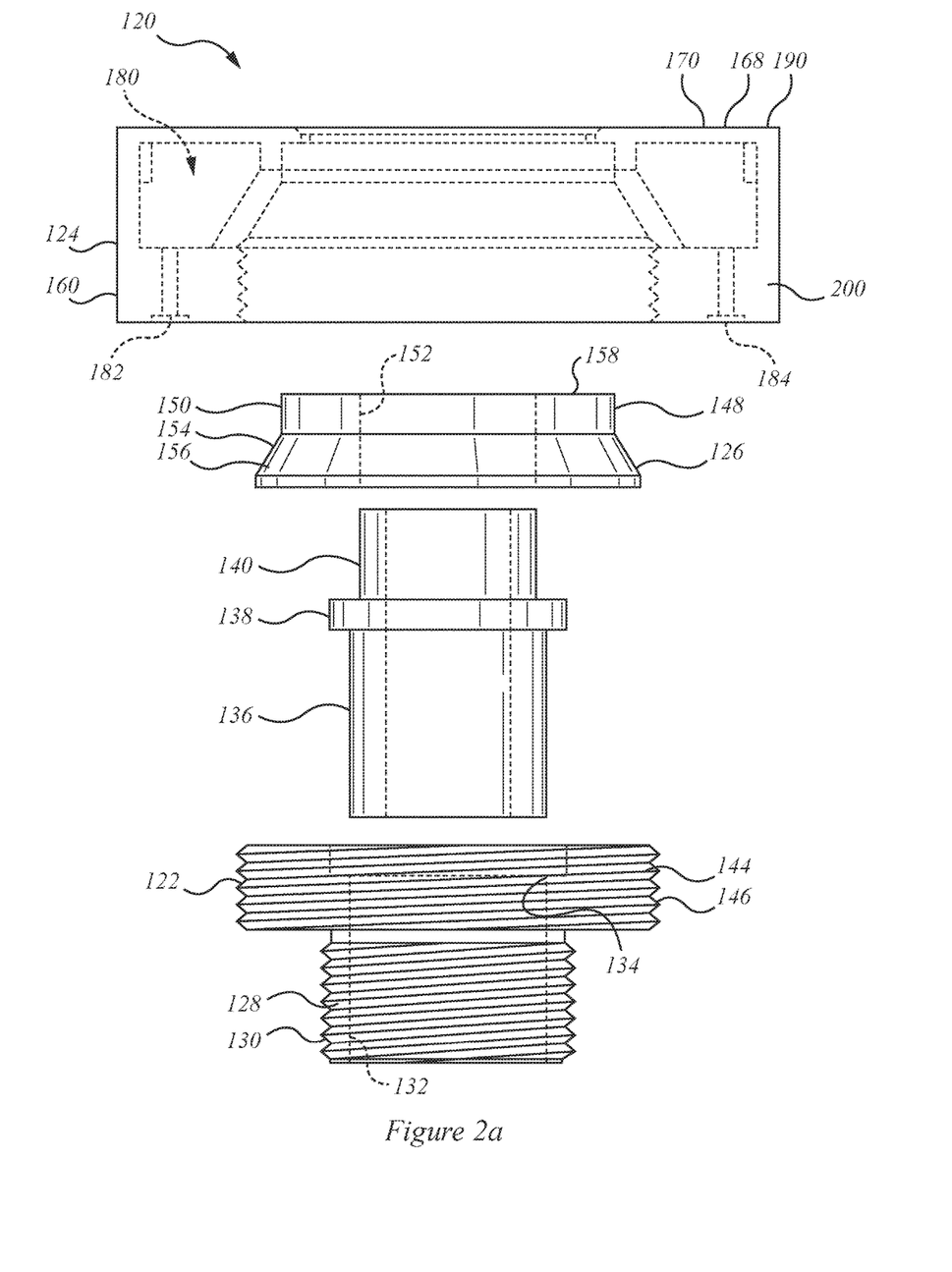
FIG. 2a shows a side view of an alternate embodiment of a welding apparatus to that of FIG. 1.
Figure 2B:
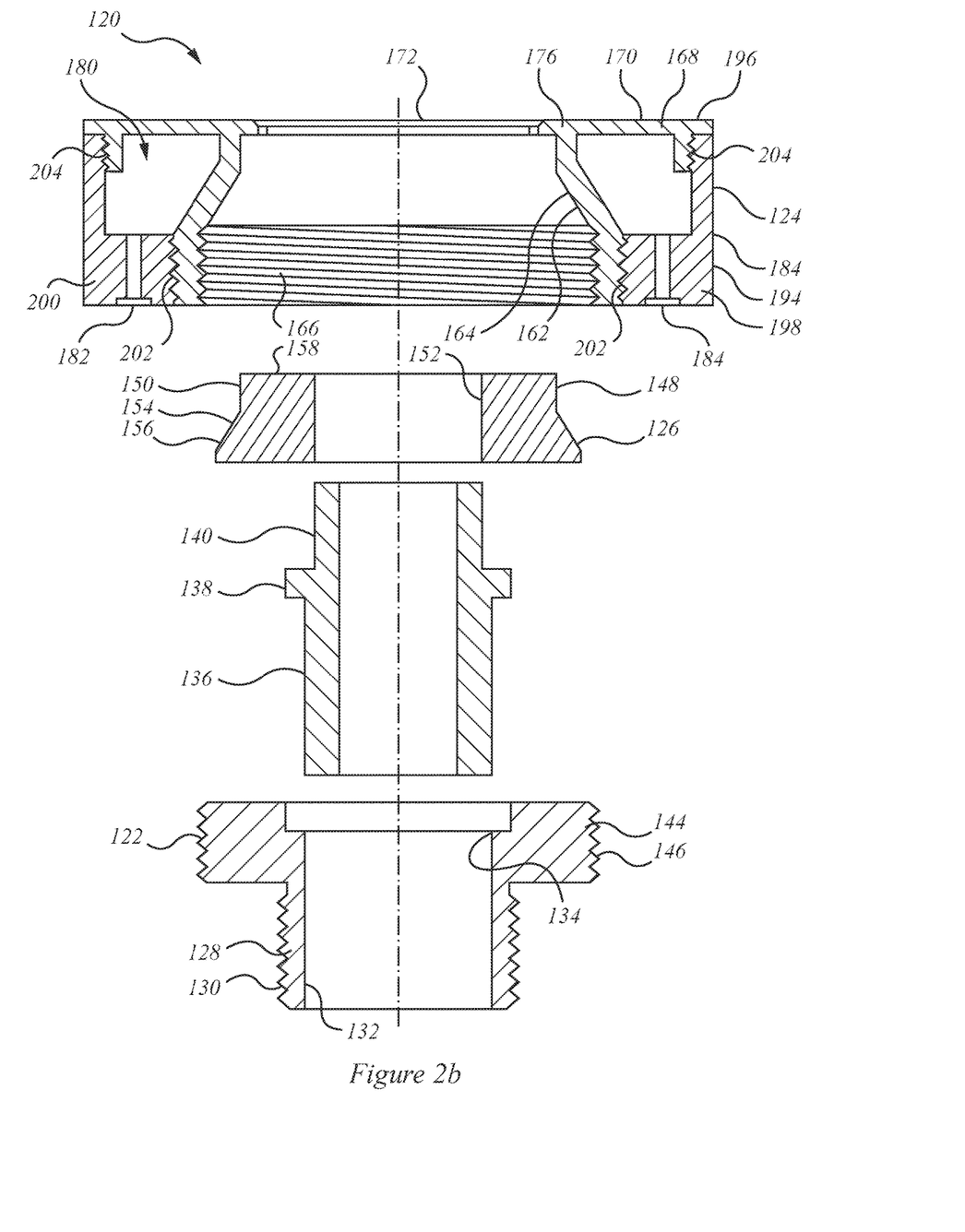
Figure 2C:
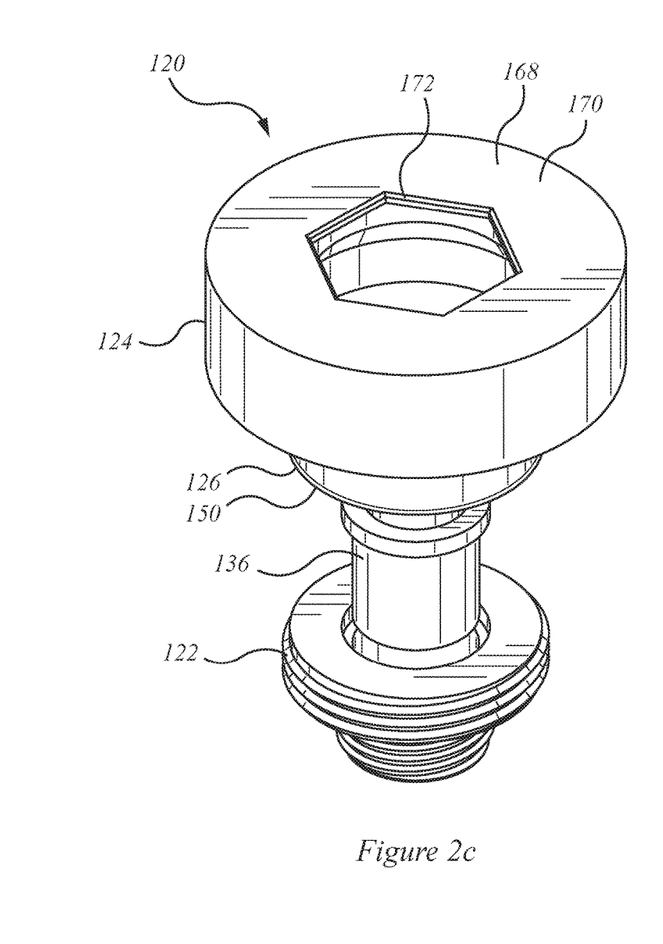
FIG. 2c shows an exploded perspective view of the welding apparatus of FIG. 2a taken from above.
Figure 2D:
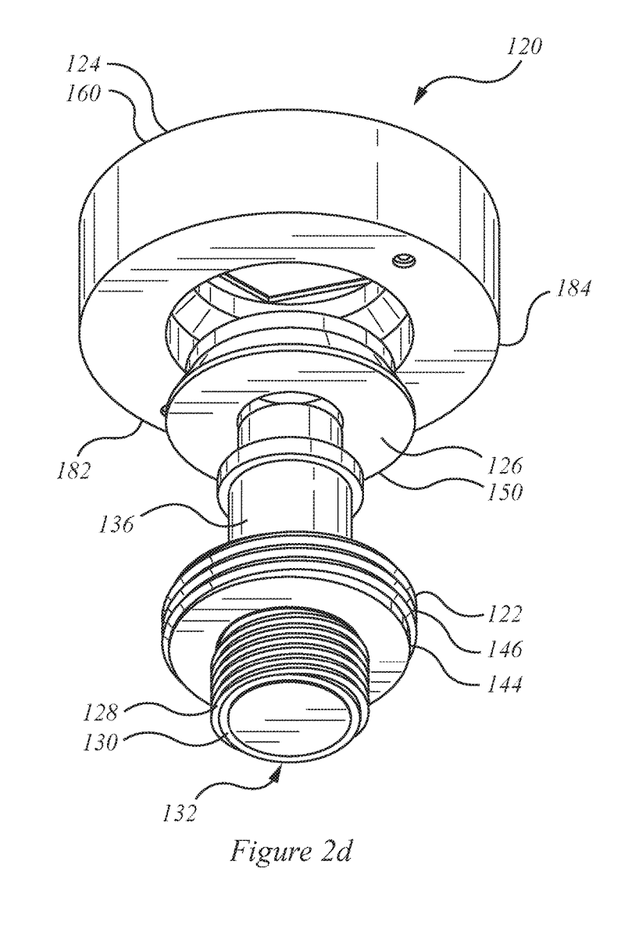
FIG. 2d shows an exploded perspective view of the welding apparatus of FIG. 2a taken from below.

In the embodiment of FIGS. 2a and 2b, a welding apparatus 120 has a first member 122, a second member 124, and a third member 126. First member 122 may be a main body member, identified as an electrode base. As before, it is typically made of copper. It has a first, or lower, end 128 that is externally threaded as at 130, by which it is screwed into an electrode holder, thereby being connected to a power source of the welding apparatus. The inside of electrode base 122 defines a smooth bore 132 that has a larger radius shoulder 134 at the upper end. An insulation sleeve 136 sits within bore 132, sleeve 136 having a mating outwardly extending shoulder 138 that seats in shoulder 134 of bore 132. Insulation sleeve 136 also has an upwardly extending annular stub 140, being proportionately longer than stub 40 of apparatus 20. Insulation sleeve 136 may be a ceramic member or an anodized plug. Sleeve 136 is sized to accommodate a reciprocating centering pin, such as pin 42, as before. First member 122 has an upper portion 144 that is externally threaded as at 146.

Third member 126 is a consumable welding electrode tip, and may have the form of an electrically conductive copper annulus, or washer, or disc 150 that has a central bore 152 that seats about axially protruding stub 140 of sleeve 136. The inlet of bore 152 is typically chamfered or radiused to facilitate seating of a first end of the workpiece fastener 110 therein. Copper disc 150 also has an external land or engagement surface 154 in the form of an axially truncated conical ring 156, and an electrically conductive end face 158 that defines the engagement interface with nut 10. It may be noted that unlike disc 50, washer or disc 150 has a cylindrical shank 148 extending axially between the upper and radially inner termination of the conical flank or skirt defined by conical ring 156.

Second member 124 may have the form of an annular clamping member 160 that has a lower section that is internally threaded as at 166 to mate with the upper, radially outermost externally threaded portion 144 of first member 122. Clamping member 160 has a radially inwardly and axially upwardly tapering conical section 162 that defines an engagement interface 164 for mating with the likewise conically shaped land of conical ring 156. The land defined by section 162 may provide a larger cross-sectional area for heat transfer between third member 126 and second member 124 as compared to conical surface 64 of apparatus 20. When clamping member 160 is tightened on threads 146, the resulting axial motion causes surface 164 to engage land 154 and to clamp disc 150 against the axially upward end face 158 of main body or base 122. A path for electric current is then established through the large, annular, planar contact surfaces of base member 122 and disc 150. In this case, the surfaces of disc 150 are flat on the top and bottom faces, and circular or conical on the radially outwardly facing surfaces, such that disc 150 may be relatively easily fabricated. Being formed on a body of revolution (i.e., being round), the angular orientation of disc 150 on stub 140 can be oriented at any angle.

Clamping member 160 has an upper end face 168. End face 168 is electrically non-conductive, and may have an aluminum oxide surface coating. It is oriented toward sheet 8 and is an electrical insulator. End face 168 may partially overhang or overlap a portion or portions of end face 158 of disc 150. The shape of the desired nut socket is formed in the opening 172 formed in end face 168. In the example illustrated, the shape of the periphery of the opening corresponds to a hexagonal shape of a hex-head nut. As before, the entry is chamfered. External end face 168 of second member 124 stands axially proud of engagement interface 158 of disc 150, as shown.

In the event that there is no nut 110 in the socket defined by opening 172 of disc 150, end face 168 will meet sheet-metal workpiece 8 before end face 158 of disc 50 can make contact, and no current will flow, tending to prevent damage to the electrode and to the workpiece. It is an error detection or error prevention feature that prevents the machine from operating in the event that no nut is in place. That is, where the angular orientation of nut 110 relative to sheet 8 is fixed, the flats of opening 172 permits seating of nut 10 only according to a pre-determined design orientation. The shape of the aperture defines, or is, an indexing fitting that governs orientation of the nut. The orientation of the flats is adjusted at the time of installation of apparatus 120 on the supporting welding base.

In the event that nut 110 falls upside-down onto disc 150, so that round end face 114 is downward, rather than upward, the tips of pads or nubs 116 will encounter the electrically non-conductive end face 168, and nut 110 will be held away from disc 150, so that the gap prevents an electrical path from being established. That is, the length of nubs 116 is less than the axial through thickness of aperture 172, such that if nut 110 is upside-down, the round bottom surface 118 of nut 110 meets end face 168 of clamping member 160 before nubs 116 can contact end face 158 of disc 150. If the electrode apparatus 120 attempts to close on sheet metal 8 no electrical current will flow, preventing a weld from being made in error. This is a second nut orientation error While disc 150 is intended to be consumable over time, the life of such units can be extended by providing the deeper end shank 148, and by preventing undue heating. To that end, the locking ring, namely clamping member 160, may have an internal cooling gallery 180, having an inlet fitting or tap at 182 and a diametrically opposed outlet fitting or tap at 184, suitable for use with coolant supply and return lines 86, 88 as above. It is possible that there could be multiple inlet and outlet lines. In operation, 3-4 US gal/minute (12-16 L/min) of cold water flows through this gallery. Clamping member 160 may be made of beryllium copper. The tight interface between clamping member 160 and threads 146 provides a good conduction heat transfer path to base member 122. The tight clamping interface across the mating conical surfaces 154 and 164 provides a direct thermal conduction path between disc 150 and member 160. There is also a secondary thermal conduction path from disc 150 through base member 122 to clamping member 160. In the embodiment of FIG. 1, bezel 162 may function as a fin, or narrowed heat transfer path section, that increases both the length and decreases the cross-sectional area of the heat transfer conductor. In the embodiment of FIGS. 2a and 2b, the length of the heat transfer path is the same as the through-thickness of the conical tapered cooling fluid gallery wall as at 174, (being the angled portion of radially inner wall 192 more generally) and the cross-sectional area of the path corresponds to the relatively large frusto-conical mating contact area between surfaces 154 and 164. The cooling fluid works directly against the back, or radially outer, side of this wall portion. It may be noted that the secondary conduction heat transfer path through first member 122 is also increased, since the lower outer radius of disc 150 is approximately the same as the thread root diameter of threads 146 of upper portion 144, giving a larger annular heat transfer area between disc 150 and first member 122. Additionally, the vertical cross-section of disc 150 is also larger, giving a wider conduction area at all locations relative to disc 50: it is a larger, deeper, wider section with larger contact areas with both first member 122 and second member 124. As seen in the Figures, rather than being generally rectangular in section, cooling fluid flow gallery 180 has a trapezoidal section in view of the tapering conical wall, as at 174.

In one embodiment, clamping member 160 may be a 3-D printed part, or it may be made by a lost wax or investment casting process. In another embodiment, clamping member 160 may be made of a bobbin 190 and a co-operating cylindrical threaded sleeve 200, the two parts being threaded to screw together. Cooling gallery 180 is bounded by a radially inner wall, 192, a radially outer wall 194, a first, front, or top end wall 196 that defines end face 168; and a second, rear, or lower end wall 198 that is distant from the workpiece. Bobbin 190 may be a monolithic part that includes walls 192 and 196. Wall 192 may be of the order of 2 to 3 mm thick at the lower threads. Walls 196 and 198 may be of the order of 2½ to 3 mm thick. Sleeve 200 includes most of outer circumferential wall 194, and most or rearward end wall 198, which are threaded at 202 and 204. On assembly, a bonding agent, which may be an eutectic bonding agent, may be applied to threads 202 and 204. The part may bond to form a sealed wall, and thereafter not be taken apart. The outside face of wall 194 may by knurled to improve grip on tightening. Rearward facing wall 198 may have the inlet and outlet ports or taps 182, 184. Placing the coolant taps in the rear wall, i.e., in the protected lee of clamping member 160 more generally, may tend to protect those fittings, as opposed to having them on the outside, knurled tightening surface where they may be more prone to abuse or damage. It also means that the external surface, whether knurled or provided with flats for engagement by a wrench, is free of obstruction by fittings.

The resultant coolant flow gallery may then tend to be of substantially constant cross-section around the entire circumference of gallery 180. That cross-section may also be comparatively large, having a width in the radial direction that is greater than the through-thickness of either wall 192 or wall 194, or of both taken together. Furthermore, inner wall 192 is of substantially constant thickness from top to bottom, and can be relatively thin, such that the thermal conduction heat transfer path through that wall thickness to first member 122 is relatively short. Similarly, flow gallery 180 occupies substantially the full radial extent of the annulus defined between the wings or flanges of bobbin 190 defined by walls 196 and 198. That is, the exposed area for heat transfer from those walls is more than half their surface area. The wall thickness of wall 192 between the fluid flow passage and first member 122 is substantially constant about the periphery of locking member 160. The use of a flow path of roughly constant geometry may tend to discourage, or decrease, the tendency for some spots to be cooled more effectively than others, leading to a more even, or more evenly distributed, cooling effect. The flow path follows the arcuate path of the annular space extending about clamping member 160.

In this embodiment, as described, the locking ring defines a liquid cooling manifold or gallery. The locking ring defines a first, direct, conduction heat transfer path between the ring and disc 150; and also a second cooling path between the locking ring and electrode base member 122. This is so whether the base member, namely first member 122, is provided with any other internal cooling or not. Providing cooling to the locking ring may tend to permit first member 122 not to have complicated internal cooling galleries itself, and may permit the retrofit of an actively cooled locking ring to previous assemblies that may not have had active fluid cooling. First member 122 may tend to be removed and replaced more easily than the base equipment to which first member 122 is mounted. In such a retrofit installation, the geometry of threads 130 may be retained while first member 122 and second member 124 are different. In either case, base member 122 may fit in the same geometric space envelope as the previous electrode base member, avoiding a design change of the tool holder.

Although the present description is provided in the context of first and second window sub-assemblies that combine to form a larger assembly that fills the window envelope or accommodation formed in the door panel, it will be understood that such an assembly could employ additional window extensions, as may be.

What is claimed is:

1. A welding electrode apparatus comprising:
   a first member, a second member, and a third member;
   said first member defining an electrode base for connection to a power source;
   said third member defining an electrically conductive tip that mounts in electrically conductive engagement to the electrode base;
   said second member defining a clamp, said clamp being operable to secure said third member to said first member;
   said second member having an arcuately extending fluid-flow cooling gallery defined therewithin; and
   said second member is non-electrically conductive.

2. The welding electrode apparatus of claim 1, wherein said second member defines an annulus, and said cooling gallery defines a circumferentially arcuate passageway about said annulus.

3. The welding electrode apparatus of claim 1, wherein said cooling gallery is of non-circular cross-section transverse to coolant flow direction.

4. The welding electrode apparatus of claim 1, wherein said cooling gallery has a radially inner wall that is at least partially conically tapering.

5. The welding electrode apparatus of claim 1, wherein said second member is ported distantly from the third member.

6. The welding electrode apparatus of claim 1, wherein said second member has a first end face that, on assembly, is oriented axially away from said first member, said first end face being non-electrically conductive.

7. The welding electrode apparatus of claim 6, wherein said second member has a second end face distant from said first end face, and said second end face has coolant fluid ports therein.

8. The welding electrode apparatus of claim 7, wherein said coolant fluid ports are located opposite each other.

9. The welding electrode apparatus of claim 1, wherein said cooling gallery has an extent that is at least one of (a) at least half the axial extent of said second member; and (b) at least half the annular radial extent of said second member.

10. The welding electrode apparatus of claim 1, wherein said second member has an external peripheral wall that is free of obstructions, whereby said external peripheral wall can be gripped for tightening of said clamp.

11. A welding apparatus for attaching a weldable fastener to a workpiece, the fastener having a first face for electrically conductive engagement with the welding apparatus, and an opposite second face that is oriented toward the workpiece, wherein said welding apparatus comprises:
    a first member and a second member;
    said first member includes an electrically conductive electrode tip for electrical contact with the fastener;
    said second member being fixedly located relative to said first member; and
    said second member having an electrically insulated portion that stands proud of said first member; and
    said second member has a cooling gallery defined therewithin, and porting by which to supply coolant to said gallery.

12. The welding apparatus of claim 11 wherein the second member clamps to the first member.

13. The welding apparatus of claim 11 and the fastener, wherein the first face of the fastener has a first footprint, and the second face of the fastener has a second footprint, the first and second footprints are different, and at least a portion of the second footprint projects outside the first footprint, and said second member has a land accommodating the first footprint but not the second footprint.

14. The welding apparatus of claim 11 wherein said second member defines an annulus, and said cooling gallery defines a circumferentially arcuate passageway about said annulus.

15. The welding apparatus of claim 11 wherein said cooling gallery is of non-circular cross-section transverse to coolant flow direction.

16. The welding apparatus of claim 11 wherein said cooling gallery has a radially inner wall that is at least partially conically tapering.

17. The welding apparatus of claim 11 wherein said second member has a first end wall for orientation toward the workpiece, and a second end wall that faces away from said first end wall, and said second end wall has coolant fluid ports therein.

18. The welding apparatus of claim 11 wherein said cooling gallery has an extent that is at least one of (a) at least half the axial extent of said second member; and (b) at least half the annular radial extent of said second member.

19. The welding of claim 11 wherein said second member has an external peripheral wall that is free of obstructions, whereby said external peripheral wall can be gripped for tightening of said second member relative to said first member.

20. A welding apparatus for attaching a weldable fastener to a workpiece, the fastener having a first face for electrically conductive engagement with the welding apparatus, and an opposite second face that is oriented toward the workpiece, wherein said welding apparatus comprises:
    a first member and a second member;
    said first member includes an electrically conductive electrode tip for electrical contact with the fastener;
    said second member being fixedly located relative to said first member; and
    said second member having an electrically insulated portion that stands proud of said first member; and
    said second member has an accommodation defined therein having a shape conforming to, and admitting, the first face of the fastener.

* * * * *